US 6,647,704 B2

(12) United States Patent
Penny et al.

(10) Patent No.: US 6,647,704 B2
(45) Date of Patent: Nov. 18, 2003

(54) AQUATIC VEGETATION SHREDDER HAVING BOW AND STERN MOUNTED HIGH SPEED, LARGE CHOPPING PROPELLERS

(75) Inventors: David M. Penny, Lawrence, KS (US); Kenneth F. Knapp, DeSoto, KS (US); Gerald S. Harvey, Lawrence, KS (US)

(73) Assignee: The Master"s Dredging Company, Inc., Lawrence, KS (US)

( * ) Notice: Subject to any disclaimer, the term of this patent is extended or adjusted under 35 U.S.C. 154(b) by 0 days.

(21) Appl. No.: 10/231,885

(22) Filed: Aug. 28, 2002

(65) Prior Publication Data

US 2003/0005673 A1 Jan. 9, 2003

Related U.S. Application Data

(63) Continuation of application No. 09/496,437, filed on Feb. 2, 2000, now Pat. No. 6,449,931.

(51) Int. Cl.[7] .............................................. A01D 44/00
(52) U.S. Cl. .............................................. 56/8; 440/79
(58) Field of Search ........................... 56/8, 9; 440/79, 440/91, 53, 49, 58–63

(56) References Cited

U.S. PATENT DOCUMENTS

| 896,361 | A | * | 8/1908 | Cage | 404/79 |
|---|---|---|---|---|---|
| 1,570,961 | A | * | 1/1926 | Golden | 440/79 |
| 1,652,504 | A | * | 12/1927 | Thau | 440/1 |
| 1,802,931 | A | * | 4/1931 | Spear | 440/80 |
| 1,865,980 | A | * | 7/1932 | Thau | 318/45 |
| 2,635,406 | A | * | 4/1953 | Chavin | 56/8 |
| 2,739,435 | A | * | 3/1956 | Wiser | 56/8 |
| 5,447,018 | A | * | 9/1995 | Harvey-Rioux et al. | 56/9 |
| 5,475,970 | A | * | 12/1995 | Landry, Jr. | 56/8 |
| 5,551,900 | A | * | 9/1996 | Dauffenbach et al. | 440/111 |
| 6,116,004 | A | * | 9/2000 | Penny et al. | 56/8 |

* cited by examiner

Primary Examiner—Thomas B. Will
Assistant Examiner—Meredith Petravick
(74) Attorney, Agent, or Firm—Hovey Williams LLP

(57) ABSTRACT

An aquatic shredder includes a watercraft and a pair of large, high speed propellers mounted at both the bow and stern ends of the watercraft. The propellers are configured to not only propel the watercraft through the water but also to chop vegetation at or near the water surface. Moreover, the bow propellers are similar in construction to the stern propellers so that they similarly effect comminution of the vegetation and propulsion of the watercraft. In particular, each pair of propellers extends completely across the width of the watercraft and projects laterally outward beyond the port and starboard sides of the watercraft. Each pair of propellers is preferably supported by a swingable frame that permits the user to raise and lower the propellers as desired. To enhance the cutting action of the propellers, the blades of the propellers may be provided with fore and aft extending knives.

29 Claims, 6 Drawing Sheets

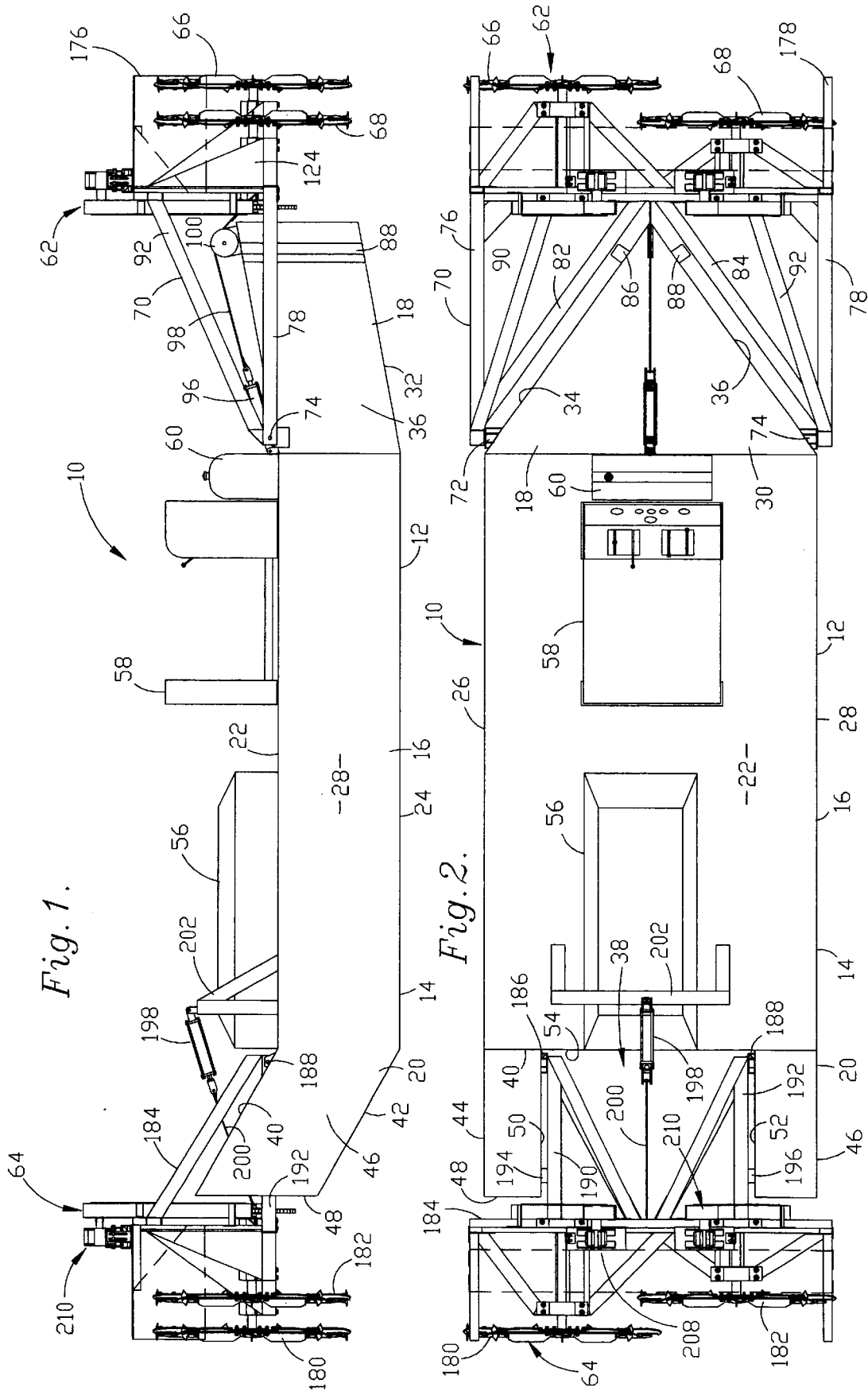

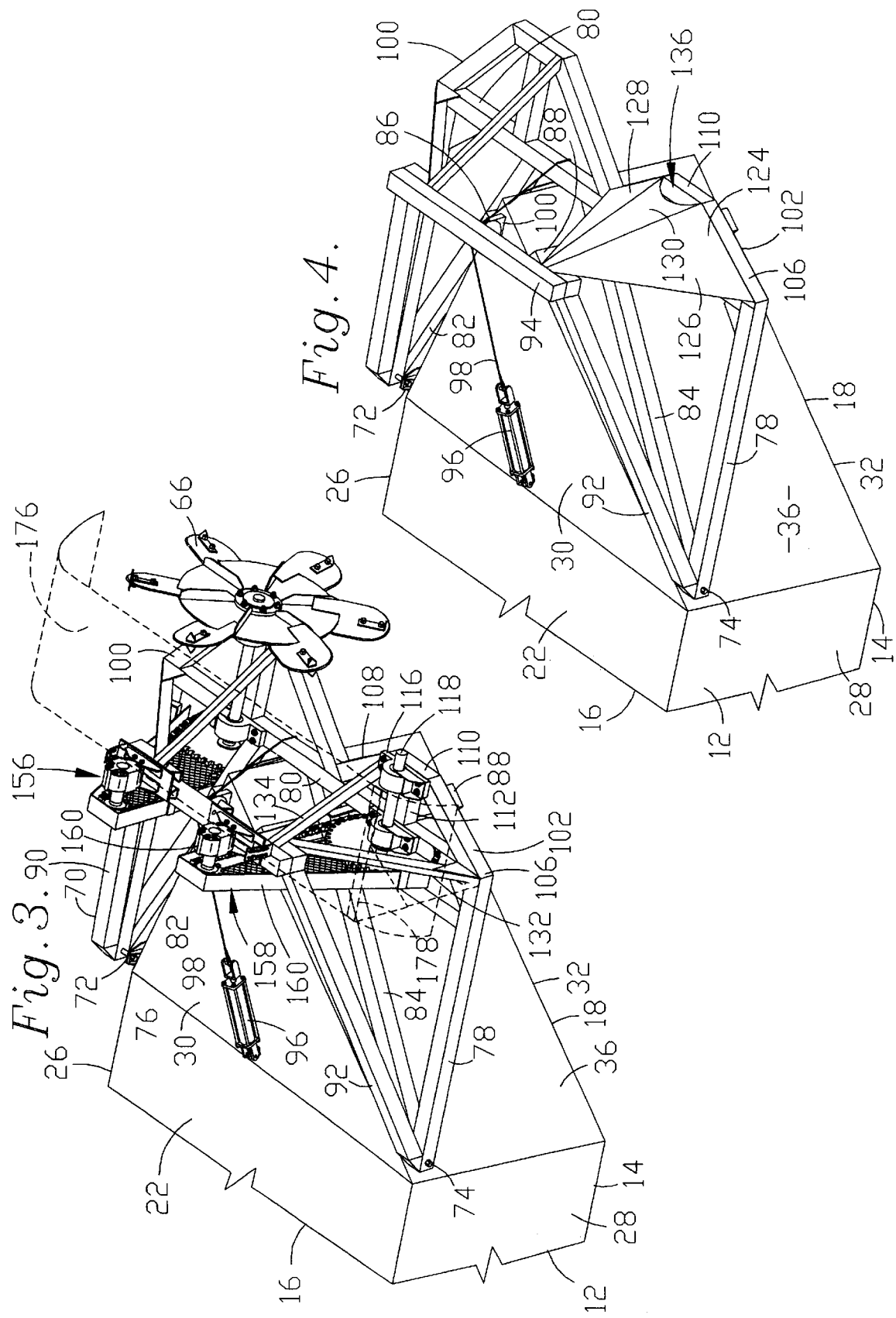

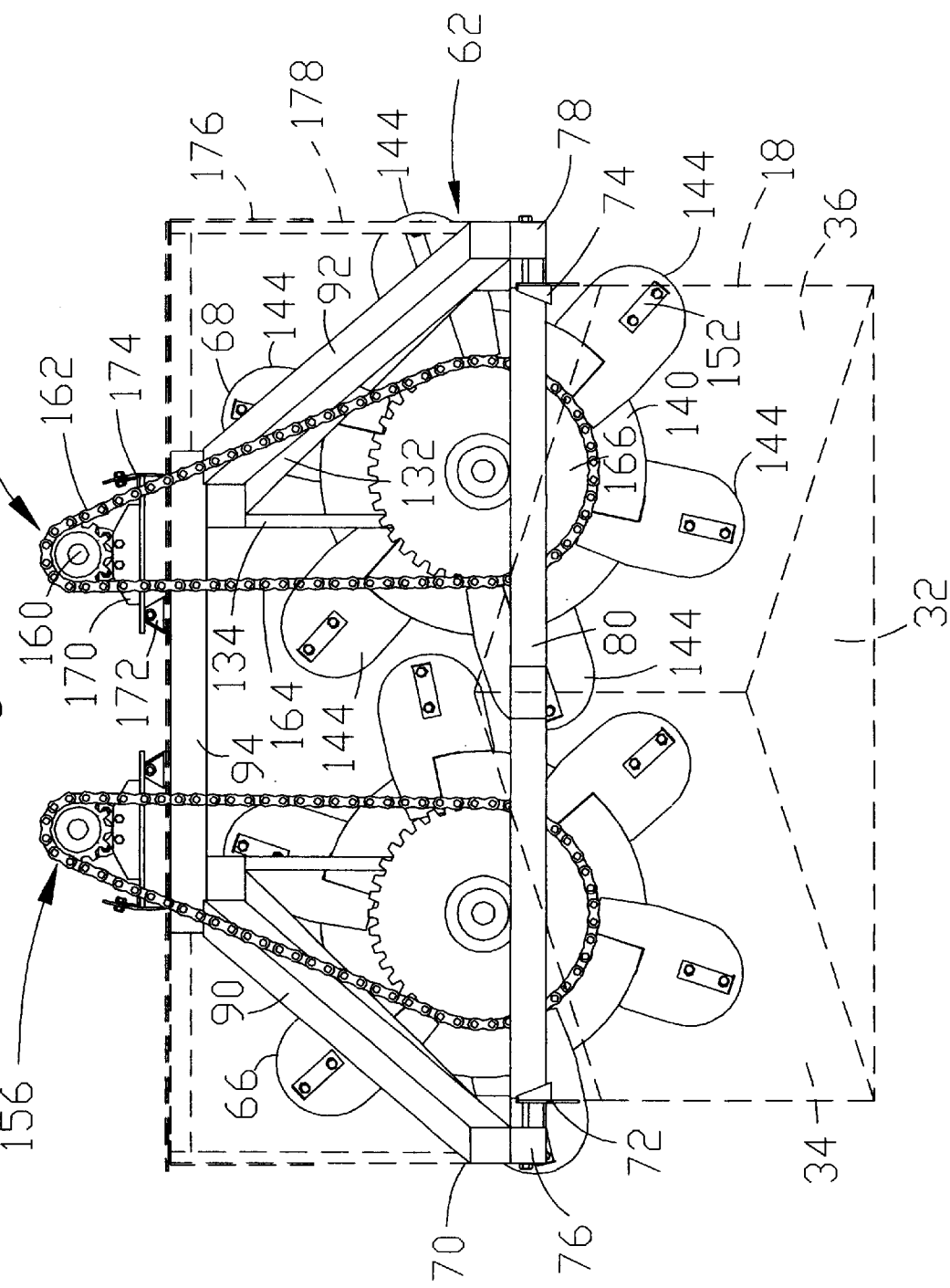

AQUATIC VEGETATION SHREDDER HAVING BOW AND STERN MOUNTED HIGH SPEED, LARGE CHOPPING PROPELLERS

RELATED APPLICATIONS

This is a continuation application of U.S. Ser. No. 09/496,437, filed Feb. 2, 2000, now U.S. Pat. No. 6,449,931, which is hereby incorporated by reference herein.

BACKGROUND OF THE INVENTION

1. Field of the Invention

The present invention relates generally to equipment for shredding, harvesting, destroying or otherwise processing aquatic vegetation. More specifically, the present invention concerns an aquatic vegetation shredder that is highly maneuverable and particularly effective in chopping extremely dense masses of aquatic vegetation.

2. Discussion of Prior Art

Aquatic vegetation can be devastating to both marine operations and the aquatic ecosystem. Unfortunately, most conventional expedients are ineffective in destroying or otherwise controlling such vegetation. These problems have previously been identified in our co-pending applications for U.S. Letters Patent, both of which are assigned of record to the assignee of the present invention and are identified as follows: Ser. No. 08/993,072, filed Dec. 18,1997, entitled APPARATUS FOR DESTROYING AQUATIC VEGETATION; and Ser. No. 09/167,911, filed Oct. 7, 1998, entitled AQUATIC VEGETATION SHREDDER.

It has been discovered that in some environments the aquatic vegetation can become so entangled and dense that the vegetation forms a virtual floating island on which large animals (e.g., deer) can be supported and trees will grow. No machine has heretofore been capable of cutting through and destroying such vegetation masses. Furthermore, once a swath is cut in the vegetation by a shredding machine, uncut vegetation will float into the open swath and, in some cases, congest the swath to such a degree that the boat must recut the swath to pass therethrough. This becomes particularly problematic with conventional machines that are configured for operation in a single direction. In certain situations, the machine may in fact become trapped within a mass of vegetation.

OBJECTS AND SUMMARY OF THE INVENTION

Responsive to these and other problems, an important object of the present invention is to provide a device that is capable of eliminating the troubles presented by aquatic vegetation, as noted in our prior applications. It is also an important object of the present invention to provide a machine that is capable of cutting through and destroying extremely dense, floating masses of vegetation. Another important object of the present invention is to provide an aquatic vegetation shredder that is highly maneuverable in a body of water. In this respect, it is an important object of the present invention to provide an aquatic vegetation shredder that is as effective moving rearwardly through the water as it is moving forwardly.

In accordance with these and other objects evident from the following description of the preferred embodiment, the present invention concerns an aquatic vegetation shredder including a watercraft and a plurality of propellers mounted at both the bow and stern ends of the watercraft for rotational movement about respective fore and aft extending axes. The propellers are configured to comminute vegetation and propel the watercraft through water when rotated. In other words, the propellers not only serve to propel the watercraft through the water, but also sufficiently chop the vegetation to prevent regrowth. The bow propellers are preferably configured similar to the stern propellers so that each set of propellers has generally the same effect on comminution of the vegetation and propulsion of the watercraft. Accordingly, operation of the machine in a rearward direction is just as effective as operation of the machine in a forward direction. Furthermore, each set of propellers preferably extends completely across the width of the watercraft and projects laterally beyond the port and starboard sides. With each set of propellers further preferably being spaced from the respective bow or stern end, the propellers will cut a swath through which the watercraft will readily pass.

Other aspects and advantages of the present invention will be apparent from the following detailed description of the preferred embodiment and the accompanying drawing figures.

BRIEF DESCRIPTION OF THE DRAWING FIGURES

A preferred embodiment of the invention is described in detail below with reference to the attached drawing figures, wherein:

FIG. 1 is a starboard side elevational view of an aquatic vegetation shredder constructed in accordance with the principles of the present invention, particularly illustrating the vegetation chopping and propulsion units in their uppermost positions;

FIG. 2 is a top plan view of the aquatic vegetation shredder;

FIG. 3 is an enlarged, fragmentary perspective view of the bow end of the shredder, with the starboard-side bow propeller being removed to depict the drive mechanism;

FIG. 4 is an enlarged, fragmentary perspective view of the bow end of the shredder similar to FIG. 3, but with both bow propellers and the drive mechanisms therefor being removed to illustrate the frame for supporting the propellers on the watercraft;

FIG. 5 is a cross-sectional view of the shredder, viewing the chopping and propulsion unit at the bow end of the shredder from the watercraft;

DETAILED DESCRIPTION OF THE PREFERRED EMBODIMENT

Figure 9:
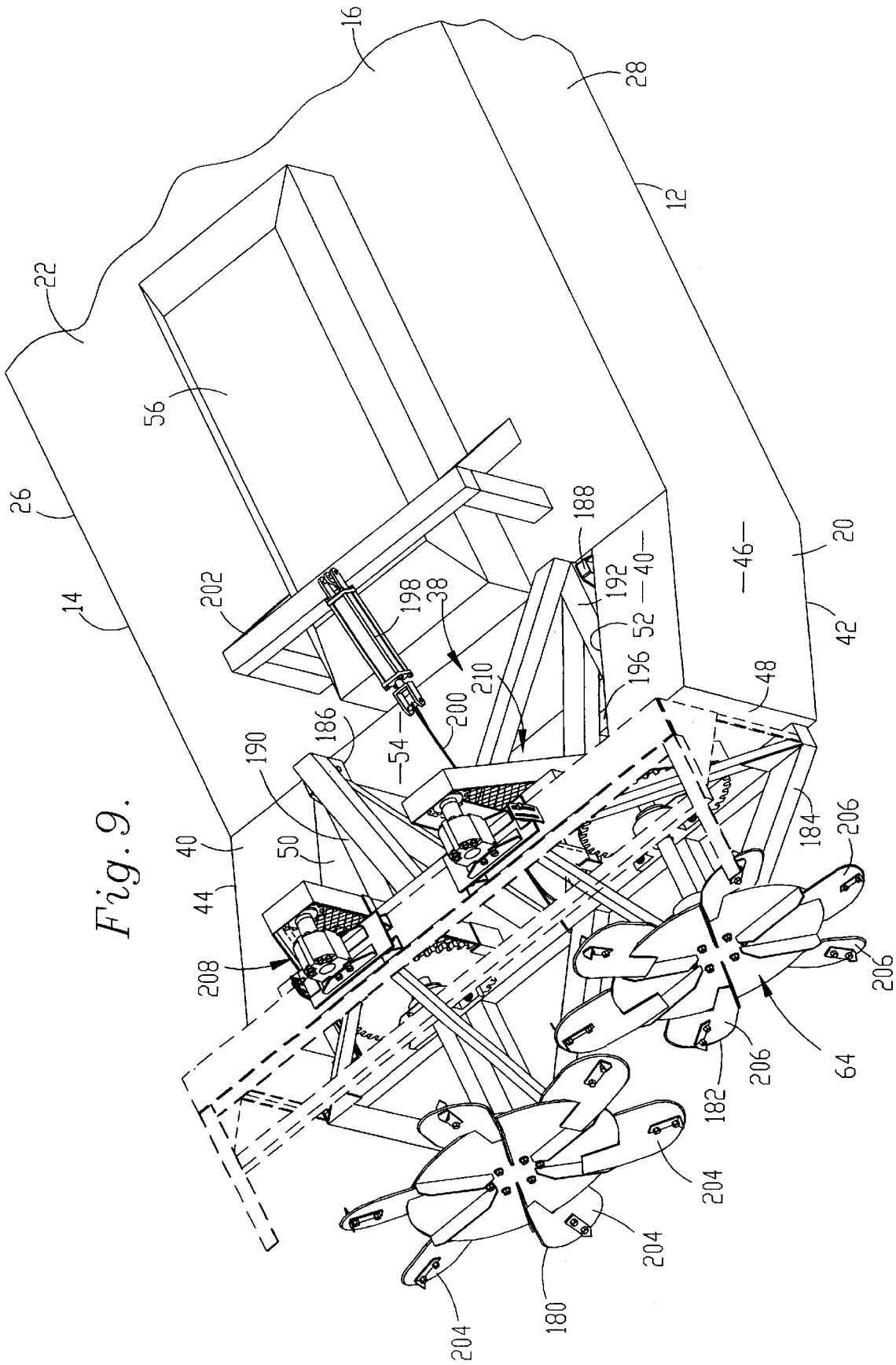
FIG. 9 is an enlarged, fragmentary view of the bow end of the shredder.

Turning initially to FIG. 1, the aquatic vegetation shredder 10 selected for illustration includes a boat 12 comprising a barge-like hull 14. The hull 14 generally includes a central section 16, a bow section 18 and a stern section 20. The central section 16 has a generally rectangular, box-like configuration and includes a top deck wall 22, a downwardly spaced bottom wall 24, and opposite port and starboard sidewalls 26 and 28. The bow section 18 tapers forwardly to present a generally triangular shape (see FIG. 2) and slopes upwardly from the central hull section 16. The bow section 18 comprises parallel top and bottom inclined walls 30 and 32 and forwardly converging sidewalls 34 and 36. Similar to the bow section 18, the stern section 20 inclines rearwardly from the central hull section 16. However, the stern hull section 20 presents an opening 38 that extends from the stern end of the hull 14 to the central section 16. In this respect, the illustrated stern section 20 includes a divided top inclined wall 40, a divided bottom inclined wall 42 that is parallel to the top inclined wall 40, parallel port and starboard sidewalls 44 and 46, a divided stern wall 48, and parallel interior walls 50 and 52 spaced inwardly from the respective port and starboard sidewalls 44 and 46. Furthermore, the central hull section 16 is provided with a rear wall 54 extending between the interior walls 50 and 52 (e.g., see FIG. 9) and cooperating with the interior walls 50 and 52 to define the opening 38.

It has been determined that the draft of the illustrated hull 14 is relatively small, which permits the shredder 10 to be used in shallow water conditions. In the preferred embodiment, the hull 14 has a bow-to-stern length of approximately twenty-five feet and a width or beam of approximately eight feet. However, the principles of the present invention are equally applicable to various other hull designs. For example, the stern hull section 20 may alternatively have the same construction as the bow hull section 18. Furthermore, the boat 12 may alternatively have a twin hull configuration wherein a space is presented between the hulls, if desired.

With the foregoing caveat in mind, at the stern end of the central hull section 16 is a cover 56 housing a power source (now shown) for providing operating power to the various components of the shredder 10. In the preferred embodiment, the power source includes an internal combustion engine (not shown) and a pressurized hydraulic power unit (also not shown) drivingly connected to the engine. A suitable engine is available from Caterpillar as Model No. 3126, having a power rating of 220 (continuous) horsepower at 2400 rpm. In the usual manner, the hydraulic power unit includes a pump driven by the engine and a fluid reservoir. The engine and hydraulic power unit are conveniently controlled from a cab 58 located just forward of the center of the boat 12. A fuel tank 60 for the engine is mounted to the deck wall 22 adjacent the bow hull section 16.

The shredder 10 includes a vegetation chopping and propulsion unit 62 at its bow end, and a similar vegetation chopping and propulsion unit 64 is provided at the stern end. Each of the chopping and propulsion units 62,64 is capable of controlling movement of the boat 12 through the water, as well as destroy vegetation encountered while the boat 12 is moved. Again, the chopping and propulsion units 62,64 are similar in construction, and they consequently provide generally the same amount of driving power and cutting action. The shredder 10 is therefore just as effective when operating in a forward direction as it is when operating in a rearward direction. It has been determined that this is particularly useful in conditions where the swath cut by the shredder 10 does not remain free of vegetation but rather becomes obstructed with uncut vegetation that has floated into the open swath. The illustrated shredder 10 may simply be reversed, with the leading unit 62 or 64 serving to cut through the closed swath or to create a new swath. The dual vegetation chopping units 62 and 64 are also particularly advantageous because any vegetation left uncut by the leading unit is likely to be destroyed by the trailing unit. Furthermore, as will subsequently be described, the units 62 and 64 are vertically adjustable so that vegetation at various depths may be destroyed in one pass through the water. Because of the similarities in the units 62 and 64, only the bow unit 62 will be described in detail herein and the stern unit 64 will then be briefly described primarily with respect to its distinctions.

The bow-mounted vegetation chopping and propulsion unit 62 includes a pair of large, high speed propellers 66 and 68 adjustably supported on the hull 14 by a swingable frame 70. As perhaps best shown in FIG. 4, a pair of aligned pivot assemblies 72 and 74 serve to swingably attach the frame 70 to the port and starboard sidewalls 34 and 36 of the bow hull section 18. The frame includes two side rails 76 and 78 that project forwardly from the respective pivot assemblies 72 and 74 and that are interconnected at their front ends by a crossbeam 80. A brace 82 extends between the rear end of the rail 76 and the crossbeam 80 in a parallel relationship with the port sidewall 34 of the bow hull section 18 (see also FIG. 2). A brace 84 similarly extends between the side rail 78 and crossbeam 80. Guide blocks 86 and 88 attached to the sidewalls 34 and 36, respectively, are each configured for sliding engagement with the corresponding brace 82 or 84. It is noted that the guide blocks 86 and 88 extend between the top and bottom walls 30 and 32 of the bow hull section 18. Moreover, the guide blocks maintain the proper orientation of the frame 70 and reduce the risk of damage to the pivot assemblies 72 and 74 which might otherwise occur as a result of side thrust loads on the frame 70. A pair of forwardly converging, upwardly sloping arms 90 and 92 project from the rear end of the side rails 76 and 78 to support an upper crossbeam 94 that is relatively shorter than the crossbeam 80.

Swinging of the frame 70 is controlled by a hydraulic cylinder 96 pivotally supported on the top wall 30 of the bow hull section 18 (see FIGS. 1–4 and 7). The cylinder 96 is connected to the frame by a cable 98 that wraps around a pulley 100. It will be appreciated that extension of the cylinder 96 corresponds with downward swinging of the frame 70, while retraction of the cylinder 96 causes upward swinging of the frame 70.

The frame 70 further includes a pair of propeller mounts 102 and 104 that serve to offset the propellers 66 and 68 in a fore-and-aft direction so that the port propeller 66 is located forward of the starboard propeller 68. The propeller mounts 102 and 104 are similar in construction. Thus, only the starboard propeller mount 104 will be described in detail herein, with the understanding that the port propeller mount 102 is similarly constructed. As perhaps best shown in FIGS. 3 and 6, the starboard propeller mount 104 includes a pair of forwardly converging bars 106,108 that project from the lower crossbeam 80. A small front bar 110 extends between the converging bars 106 and 108, and a fore-and-aft bar 112 is connected between the crossbeam 80 and front bar 110. A pair of bearing assemblies 114 and 116 are supported by the starboard mount 104 and crossbeam 80 (the rear assembly 114 being attached to the crossbeam 80 and the front assembly 116 being attached to the front bar 110), with the assemblies 114 and 116 serving to rotatably support a shaft 118 to which the starboard propeller 68 is fixed.

It is noted that a shaft scraper assembly 120 or 122 is attached to each of the bearing assemblies 114 or 115 to protect the latter against infiltration of vegetation and other debris, as well as prevent material from wrapping around the shaft 118 in the vicinity of the assemblies 114 and 115. Each of the scraper assemblies 120 and 122 includes a pair of blades placed on opposite sides of the respective bearing assembly 114 and 116. The blades each include a distal face that is spaced slightly from the shaft 118 and extends about at least half of the circumference of the shaft 118.

The bearing assemblies 114,116 and shaft 118 are further protected by a shield 124 that essentially conceals these components from the starboard propeller 68. As perhaps best shown in FIG. 4, the shield 124 comprises three triangular-shaped plates 126,128,130, each extending between the upper crossbeam 94 and a respective one of the bars 106, 108,110 of the mount 104. Framework in the form of a pair of angled bars 132, 134 are provided to assist in supporting the triangular plates 126,128,130. It is particularly noted that the outer plate 126 is attached to the bar 132, while the inner and central plates 128 and 130 are attached to the bar 134. Furthermore, an opening 136 defined at the bottom of the central plate 130 permits the shaft 118 to pass through the shield 124.

Again, the port propeller 66 is supported on the frame 70 in the same manner as the starboard propellor 68, although the port propeller mount 102 is configured to position the port propeller 66 forward of the starboard propeller 68. The support structure for the port propeller 66 is similarly protected against infiltration and contamination by vegetation and trash.

As shown in FIGS. 2 and 5, the propellers 66 and 68 cooperate to extend completely across the front of the machine 10, with the inner portions of the propellers 66 and 68 preferably overlapping in the vicinity of the fore-and-aft axis of the machine 10. It is noted that each of the propellers 66 and 68 projects laterally outward beyond the respective port and starboard sides of the boat 12. This ensures, among other things, that as the boat 12 is propelled forwardly the vegetation is first encountered by the rotating propellers 66 and 68. Because the preferred embodiment includes only two propellers, the propellers 66 and 68 are relatively large. Preferably, each of the propellers 66 and 68 have a diameter of about four to five feet and, most preferably, have a diameter of approximately five feet. It has been determined that the preferred diameter of the propellers causes the propellers to not only be particularly effective in propelling the watercraft, but also permits the propellers to be arranged (i.e., vertically adjusted) so that the entire mass of plant growth, including vegetation at the water surface and at depths well below the surface, is comminuted by the propellers. As is apparent from the drawing figures, the propellers 66 and 68 are similar in construction. Thus, only the starboard propeller 68 will be described in detail herein, with the understanding that the port propeller 66 is similarly constructed.

Figure 6:
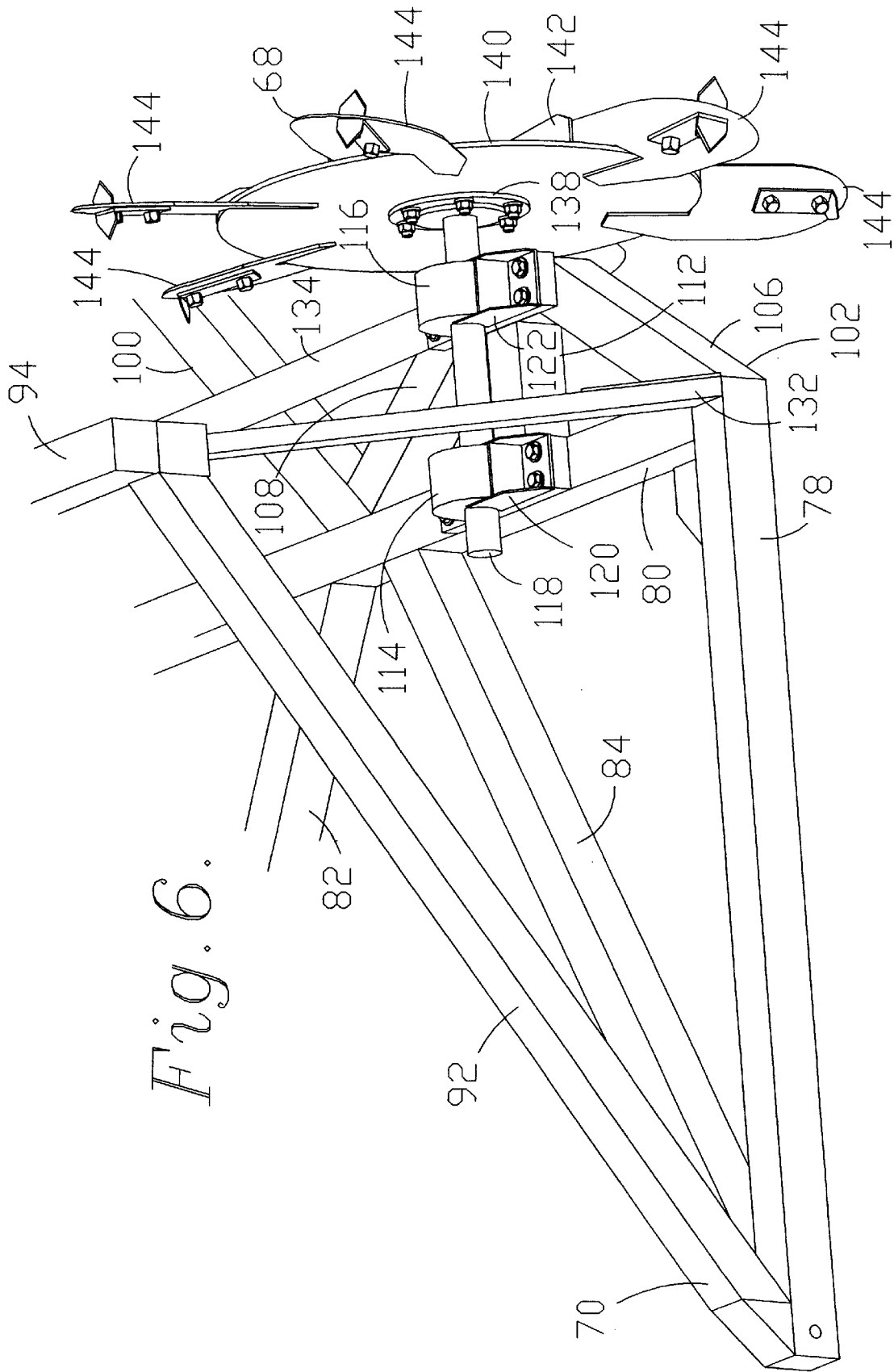
FIG. 6 is an enlarged, fragmentary perspective view of the starboard-side bow propeller mounted on the bow frame.
Figure 7:
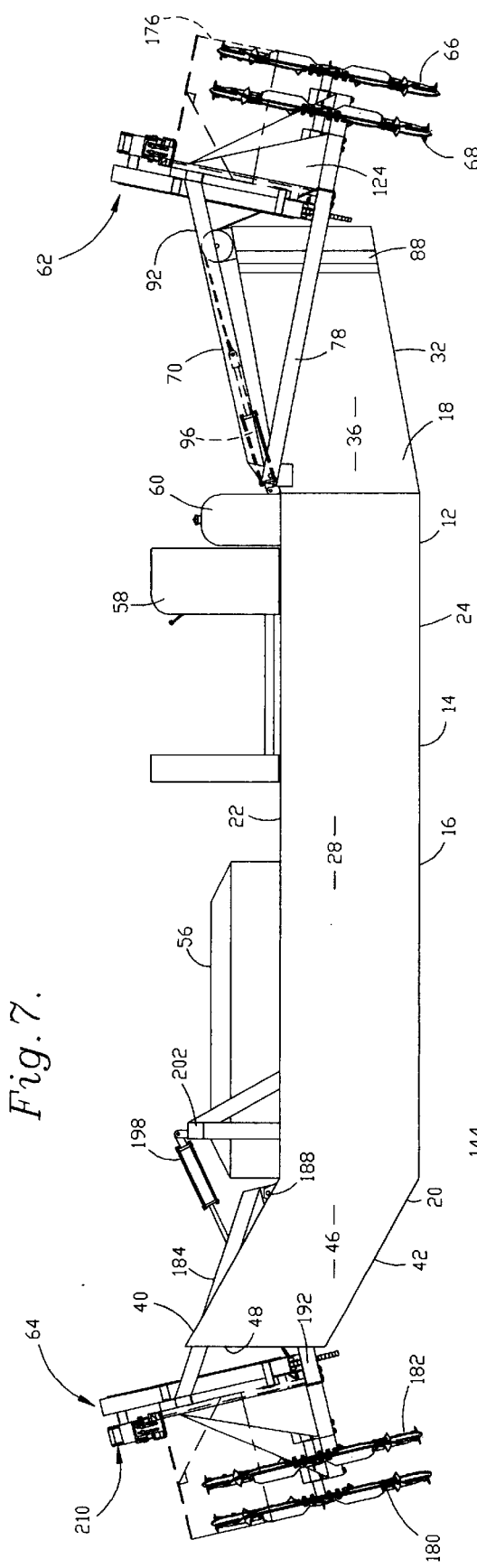
FIG. 7 is a side elevational view of the shredder similar to FIG. 1, but illustrating both chopping and propulsion units being swung downwardly to the lowermost position.
Figure 8:
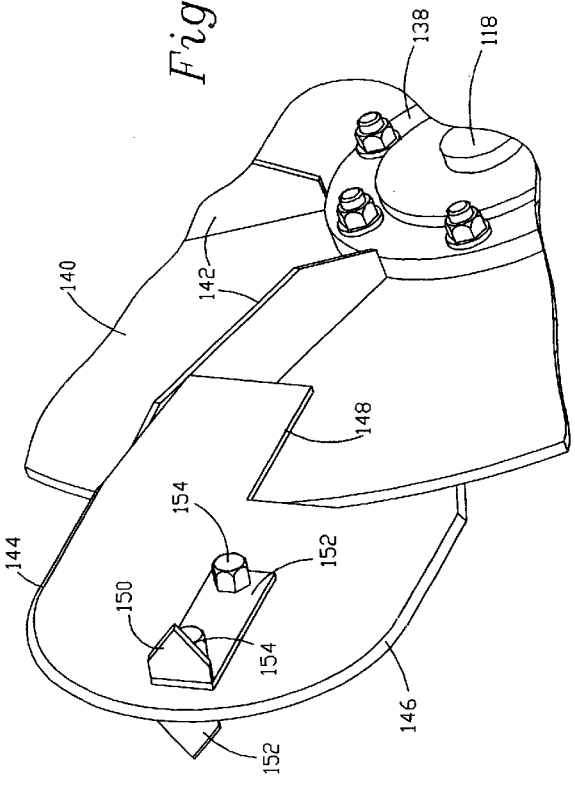
FIG. 8 is a greatly enlarged fragmentary view of the starboard-side bow propeller, particularly illustrating the knives mounted on each blade of the propeller.

As perhaps best shown in FIGS. 5, 6 and 8, the starboard propeller 68 includes a hub 138 fixed to the shaft 118. A circular disk 140 projects from the hub 138. The disk 140 is stiffened by a plurality of circumferentially spaced, radially extending ribs 142 (preferably six) attached to the front face of the disk 140. The propeller 68 includes six blades 144 that are spaced about the circumference of the disk 140 to project radially relative to the shaft 118 (i.e., the rotational axis of the propeller 68). As shown in FIG. 8, each blade 144 has a beveled, U-shaped outer edge 146 and a slot 148 configured to receive the disk 140 therein. Each of the illustrated blades 144 is positioned adjacent one of the ribs 142. The blades 144 are all preferably oriented at the same pitch angle which is preferably thirty degrees relative to the disk 140. Although the illustrated blades 144 are fixed to the disk 140 at a predetermined pitch angle, it is entirely within the ambit of the present invention to provide a propeller that is configured to permit adjustment of the blade pitch angle. It is also noted that the orientation of the blades 144 is such that the starboard propeller 68 provides forward propulsion to the boat 12 when rotated in a counterclockwise direction when viewed from the rear.

It will be appreciated that the beveled outer edge 146 of each blade 144 serves to cut and chop vegetation when the propeller 68 is rotated in either direction. However, each of the blades 144 is also provided with a pair of knives 150 that significantly enhance the cutting action of the propeller 68 (see FIG. 8). In the illustrated embodiment, the knives 150 project in opposite directions from the blade 144 along a line that is generally parallel to the rotational axis of the propeller 68. The knives 150 are preferably removably attached to the blade 144 so that they may be replaced as necessary. In particular, each of the knives 150 is attached to a base plate 152 that lies flatly against the blade 144, such that the knife and base plate cooperatively present an L-shaped configuration. A pair of fasteners 154 serve to removably attach the knives 150 to the blade 144. It is also particularly noted that each of the knives 150 has a triangular configuration to present a V-shaped sharpened cutting edge.

Again, the port propeller 66 is similar to the starboard 68 and will not be described in detail herein. However, the blades of the port propeller 66 are pitched in an opposite direction relative to the blades 144 of the starboard propeller 68, although the opposite pitch angles are equal in degree. Accordingly, the port propeller is rotated in a clockwise direction (when viewed from the rear) to provide forward propulsion to the boat 12. The propellers 66 and 68 consequently rotate in opposite directions when they are used to propel the boat 12 in a forward or rearward direction.

Rotation of the port and starboard propellers 66 and 68 is controlled by separate drives 156 and 158 (see particularly FIGS. 3 and 5). The drives 156,158 are similar in construction and, again, only the starboard drive 158 will be described in detail. The drive 158 includes a variable speed hydraulic motor 160 that is connected to the hydraulic power unit (not shown). A sprocket 162 mounted on the output shaft of the motor 160 is entrained by a chain 164 that extends downwardly to wrap around a relatively large sprocket 166 fixed to the shaft 118. The differences in sprocket sizes causes the starboard propeller 68 to be rotated at relatively high speeds. Preferably, the drive 158 is configured to rotate the propeller 68 at speeds ranging between zero and about four-hundred rpm. A shield 168 extends along the rear side of the drive 158 to cover the drive sprocket 162, the upper half of the driven sprocket 166, and the stretches of the chain 164 extending therebetween. It is also noted that the motor 160 is supported by an adjustable stand 170 so that undesirable chain slack may be eliminated. The stand 170 is pivotally supported at one end by a pedestal 172 and adjustably attached at the other end to an arcuately shaped plate 174 (see FIG. 5). For example, if there is excess slack in the chain 164 (e.g., as a result of wear), the stand 170 is temporarily detached from the plate 174, then swung in a counterclockwise direction about the pedestal 172 (when viewing FIG. 5), and finally resecured to the plate 174. The pedestal 172 and plate 174 are attached to the top surface of the upper crossbeam 94. The port drive 156 is essentially identical to the starboard side 158 and is consequently capable of rotating the port propeller 66 at the same speeds.

In the illustrated embodiment, the bow-mounted vegetation chopping and propulsion unit 62 includes a flexible shroud 176 supported by a framework 178 attached to the frame 70 (see FIGS. 1, 2, 3 and 5). The shroud 176 extends over the propellers 66 and 68 and partly downward along their outer margins. Those ordinarily skilled in the art will appreciate that the shroud 176 prevents the propellers 66 and 68 from throwing water and vegetation onto the boat 12.

As previously noted, the stern-mounted vegetation chopping and propulsion unit 64 is very similar in construction to the bow-mounted unit 64. Thus, it shall be sufficient to explain that the stern-mounted unit 64 includes a pair of large, high speed propellers 180 and 182 supported on the hull 14 by a swingable frame 184. The frame 184 is pivotally attached to the interior walls 50 and 52 of the stern hull section 20 by pivot assemblies 186 and 188 (see FIGS. 2 and 9). The side rails 190 and 192 of the frame 184 are parallel to and spaced slightly inward of the respective interior walls 50 and 52, with guide blocks 194 and 196 being provided on the walls 50 and 52 to assist with maintaining proper orientation of the frame 184. Swinging of the frame 184 is controlled by a hydraulic cylinder 198. The cylinder 198 is connected to the frame 184 by a cable 200 and is pivotally supported on the central hull section 16 by a stand 202.

Preferably, the propellers 180 and 182 are essentially identical in construction to the bow-mounted propellers 66 and 68, with the propellers 180 and 182 overlapping at the center of the boat 12 to extend completely between the port and starboard sides and projecting laterally outward beyond the port and starboard sides. It is noted, however, that the construction of the stern propellers 180 and 182 may be slightly different from that of the bow propellers 66 and 68 without departing from the spirit of the present invention. For example, in some instances, it is desirable to have stern propellers that are slightly smaller than the bow propellers (e.g., stern propellers having a diameter of about four feet and bow propellers having a diameter of about five feet). Those ordinarily skilled in the art will appreciate that such an alternative might require reconfiguration of the frame 184, as it might be desirable to ensure that the smaller propellers project to the sides of the boat 12.

The stern-mounted port propeller 180 preferably has blades 204 pitched in the opposite direction but same degree as the bow-mounted port propeller 66. The blades 206 of the stern-mounted starboard propeller are pitched in the opposite direction than the blades 204 of the stern-mounted port propeller 180, such that the blades 206 are opposite in direction but similar in degree to the bow-mounted starboard propeller 68. In this respect, the propellers 180 and 182 are rotated in opposite directions when the boat is propelled thereby in a forward or rearward direction.

The propellers 180 and 182 are individually driven by respective drives 208 and 210. Although not illustrated, it is noted that each of the frame cylinders 96 and 198 is preferably controlled by a separate control (e.g., a lever) that regulates fluid flow between the hydraulic power unit and the cylinder. Furthermore, the propeller drives 156,158,208, 210 are each preferably controlled by a separate control (e.g., a lever), whereby the drives are independent and separately controlled. The drives 156,158,208,210 are preferably connected to separate pumps (not shown) which are continuously supplied fluid from the hydraulic power unit. A flow diverter control (also not shown) is also preferably provided so that hydraulic flow may be diverted to the pumps for just the bow-mounted propellers 66, 68 or the stern-mounted propellers 180,182. This permits the power to either one of the chopping and propulsion units to be increased, when necessary.

It is noted that either or both pairs of propellers may be used to propel the boat 12. For example, it may be desirable to propel the boat 12 forwardly but chop vegetation with only the rear propellers 180 and 182, in which case only the rear propellers 180 and 182 would be driven. Such operation would involve rotating the propellers 180 and 182 in opposite directions (with the port propeller 180 rotating in a clockwise direction and the starboard propeller 182 rotating in a counterclockwise direction, when viewed from the rear). The propellers 180 and 182 are rotated the same speed when the boat 12 is propelled straight forward or rearward, and the speed is varied between the propellers 180 and 182 when a gradual turn is made. If desired, a sharper or more immediate turn may be maneuvered by rotating both propellers 180, in the same direction. Although it might appear that this only results in propulsion forces in opposite directions (i.e., one propeller is propelling forward, while the other is propelling rearward), the propellers 180 and 182 essentially function as paddles and cause the stern end of the boat 12 to be moved to one side or the other. In fact, a so-called "zero radius turn" may be maneuvered by rotating both bow-mounted propellers 66,68 in one direction and both stern-mounted propellers 180,182 in the opposite direction.

It will be appreciated that the shredder 10 is highly versatile. For example, the shredder can be used in virtually any environment and can be used to destroy virtually any type of aquatic vegetation. It is particularly noted that the large propellers 66,68,180,182 are capable of simultaneously chopping vegetation at both the water surface and well below the surface. Furthermore, the frames 70 and 184 are swingable so that the propellers 66,68,180,182 maybe oriented at essentially any position between the horizontal position shown in FIG. 1 and the lowered position shown in FIG. 7, inclusive. It is also noted that the propellers 66,68, 180,182 do not fling water and vegetation in either primary direction of travel of the boat 12 (i.e., forward or rearward), and movement of vegetation toward the propellers 66,68, 180,182 is not thereby impeded. But rather the propellers 66,68,180,182 naturally draw vegetation and water to themselves, and any water and vegetation thrown by the propellers is directed laterally. If desired, both pairs of propellers 66,68 and 180,182 may be simultaneously driven and may be positioned at different depths depending on the orientations of the swingable frames 70 and 184. In addition, with the chopping and propulsion units 62 and 64 being at least substantially similar in construction, the shredder 10 cuts rearwardly through a mass of vegetation just as well as it can in a forward direction.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. An aquatic vegetation shredder, comprising:
   a watercraft;
   a plurality of stern propellers mounted on the watercraft adjacent the stern end, with each of the stern propellers being rotatable about a respective one of a plurality of laterally spaced, generally fore and aft extending stern axes; and a plurality of bow propellers mounted on the watercraft adjacent the bow end, with each of the bow propellers being rotatable about a respective one of a plurality of laterally spaced, generally fore and aft extending bow axes;

said stern and bow propellers being configured to comminute vegetation and propel the watercraft through water when rotated, said stern propellers cooperatively extending from the port side to the starboard side of the watercraft and projecting laterally outward beyond the port and starboard sides, said bow propellers cooperatively extending from the port side to the starboard side of the watercraft and projecting laterally outward beyond the port and starboard sides.

2. An aquatic vegetation shredder as claimed in claim 1, said stern propellers being spaced rearwardly from the stern end of the watercraft, said bow propellers being spaced forwardly from the bow end of the watercraft.

3. An aquatic vegetation shredder as claimed in claim 2, said stern propellers being offset in a fore-and-aft direction relative to one another, and said stern axes being spaced in such a manner that adjacent ones of the stern propellers partly overlap one another, said bow propellers being offset in a fore-and-aft direction relative to one another, and said bow axes being spaced in such a manner that adjacent ones of the bow propellers partly overlap one another.

4. An aquatic vegetation shredder as claimed in claim 3, each of said stern and bow propellers being about four to five feet in diameter.

5. An aquatic vegetation shredder as claimed in claim 1, said plurality of stern propellers comprising only two of said stern propellers, and said plurality of said bow propellers comprising only two of said bow propellers.

6. An aquatic vegetation shredder as claimed in claim 1, said stern and bow propellers being independently operable so that operation of each plurality of propellers is independent of operation of the other plurality of propellers.

7. An aquatic vegetation shredder, comprising:

a watercraft;

a plurality of stern propellers mounted on the watercraft adjacent the stern end, with each of the stern propellers being rotatable about a respective one of a plurality of laterally spaced, generally fore and aft extending stern axes; and a plurality of bow propellers mounted on the watercraft adjacent the bow end, with each of the bow propellers being rotatable about a respective one of a plurality of laterally spaced, generally fore and aft extending bow axes;

said stern and bow propellers being configured to comminute vegetation and propel the watercraft through water when rotated, each of said stern and bow propellers including a plurality of blades projecting radially relative to the respective one of the stern or bow axes, with at least some of the blades of the propellers being provided with at least one knife extending therefrom in a direction that is generally parallel to the respective axis.

8. An aquatic vegetation shredder, comprising:

a watercraft;

a plurality of stern propellers mounted on the watercraft adjacent the stern end, with each of the stern propellers being rotatable about a respective one of a plurality of laterally spaced, generally fore and aft extending stern axes; and a plurality of bow propellers mounted on the watercraft adjacent the bow end, with each of the bow propellers being rotatable about a respective one of a plurality of laterally spaced, generally fore and aft extending bow axes;

said stern and bow propellers being configured to comminute vegetation and propel the watercraft through water when rotated, each of said stern and bow propellers including a plurality of blades projecting radially relative to the respective one of the stern or bow axes, and further including a pair of knives extending in opposite directions from each of the blades.

9. An aquatic vegetation shredder, comprising:

a watercraft;

a plurality of stern propellers mounted on the watercraft adjacent the stern end, with each of the stern propellers being rotatable about a respective one of a plurality of laterally spaced, generally fore and aft extending stern axes; and a plurality of bow propellers mounted on the watercraft adjacent the bow end, with each of the bow propellers being rotatable about a respective one of a plurality of laterally spaced, generally fore and aft extending bow axes;

said stern and bow propellers being configured to comminute vegetation and propel the watercraft through water when rotated, said plurality of stern propellers comprising only two of said stern propellers, and said plurality of said bow propellers comprising only two of bow propellers, said stern propellers each including a plurality of blades that project radially relative to the respective one of the stern axes and are pitched in an opposite direction than the blades of the other stern propeller, such that the stern propellers are rotated in opposite directions to propel the watercraft in a forward or backward direction, said bow propellers each including a plurality of blades that project radially relative to the respective one of the bow axes and are pitched in an opposite direction than the blades of the other bow propeller, such that the bow propellers are rotated in opposite directions to propel the watercraft in a forward or backward direction.

10. An aquatic vegetation shredder, comprising:

a watercraft;

a plurality of stern propellers mounted on the watercraft adjacent the stern end, with each of the stern propellers being rotatable about a respective one of a plurality of laterally spaced, generally fore and aft extending stern axes; and a plurality of bow propellers mounted on the watercraft adjacent the bow end, with each of the bow propellers being rotatable about a respective one of a plurality of laterally spaced, generally fore and aft extending bow axes;

said stern and bow propellers being configured to comminute vegetation and propel the watercraft through water when rotated, each of said stern and bow propellers being adjustably supported on the watercraft so that each of propellers may be vertically shifted relative to the watercraft.

11. An aquatic vegetation shredder as claimed in claim 10;
a stern frame rotatably supporting the stern propellers and being swingably mounted on the watercraft to permit simultaneous vertical shifting of the stern propellers relative to the watercraft; and
a bow frame rotatably supporting the bow propellers and being swingably mounted on the watercraft to permit simultaneous vertical shifting of the bow propellers relative to the watercraft.

12. An aquatic vegetation shredder, comprising:
a watercraft;
a first vegetation chopping and propulsion unit supported on the watercraft adjacent the stern end; and
a second vegetation chopping and propulsion unit supported on the watercraft adjacent the bow end,
each of said vegetation chopping and propulsion units being operable to comminute vegetation and propel the watercraft through water,
said vegetation chopping and propulsion units being generally similar in construction so as to similarly effect comminution of vegetation as well as propulsion of the watercraft,
said first vegetation chopping and propulsion unit comprising a first pair of propellers mounted on the watercraft for rotation about a respective one of a first pair of laterally spaced, generally fore-and-aft extending axes,
said second vegetation chopping and propulsion unit comprising a second pair of propellers mounted on the watercraft for rotation about a respective one of a second pair of laterally spaced, generally fore-and-aft extending axes,
each of said pairs of propellers cooperatively extending from the port side to the starboard side of the watercraft and projecting laterally outward beyond the port and starboard sides.

13. An aquatic vegetation shredder as claimed in claim 12, said first pair of propellers being spaced rearwardly from the stern end of the watercraft, said second pair of propellers being spaced forwardly from the bow end of the watercraft.

14. An aquatic vegetation shredder as claimed in claim 13, each of said pairs of propellers being arranged so that the propellers are offset in a fore-and-aft direction relative to one another and partly overlap one another.

15. An aquatic vegetation shredder as claimed in claim 14, each of said propellers being about four to five feet in diameter.

16. An aquatic vegetation shredder as claimed in claim 12, said first and second vegetation chopping and propulsion units being independently operable so that operation of each unit is independent of operation of the other unit.

17. An aquatic vegetation shredder, comprising:
a watercraft;
a first vegetation chopping and propulsion unit supported on the watercraft adjacent the stern end; and
a second vegetation chopping and propulsion unit supported on the watercraft adjacent the bow end,
each of said vegetation chopping and propulsion units being operable to comminute vegetation and propel the watercraft through water,
said vegetation chopping and propulsion units being generally similar in construction so as to similarly effect comminution of vegetation as well as propulsion of the watercraft,
said first vegetation chopping and propulsion unit comprising a first pair of propellers mounted on the watercraft for rotation about a respective one of a first pair of laterally spaced, generally fore-and-aft extending axes,
said second vegetation chopping and propulsion unit comprising a second pair of propellers mounted on the watercraft for rotation about a respective one of a second pair of laterally spaced, generally fore-and-aft extending axes,
each of said propellers including a plurality of blades projecting radially relative to the respective one of the first or second axes, with at least some of the blades of the propellers being provided with at least one knife extending therefrom in a direction that is generally parallel to the respective axis.

18. An aquatic vegetation shredder, comprising:
a watercraft;
a first vegetation chopping and propulsion unit supported on the watercraft adjacent the stern end; and
a second vegetation chopping and propulsion unit supported on the watercraft adjacent the bow end,
each of said vegetation chopping and propulsion units being operable to comminute vegetation and propel the watercraft through water,
said vegetation chopping and propulsion units being generally similar in construction so as to similarly effect comminution of vegetation as well as propulsion of the watercraft,
said first vegetation chopping and propulsion unit comprising a first pair of propellers mounted on the watercraft for rotation about a respective one of a first pair of laterally spaced, generally fore-and-aft extending axes,
said second vegetation chopping and propulsion unit comprising a second pair of propellers mounted on the watercraft for rotation about a respective one of a second pair of laterally spaced, generally fore-and-aft extending axes,
each of said propellers including a plurality of blades projecting radially relative to the respective one of the first or second axes, and further including a pair of knives extending in opposite directions from each of the blades.

19. An aquatic vegetation shredder, comprising:
a watercraft;
a first vegetation chopping and propulsion unit supported on the watercraft adjacent the stern end; and
a second vegetation chopping and propulsion unit supported on the watercraft adjacent the bow end
each of said vegetation chopping and propulsion units being operable to comminute vegetation and propel the watercraft through water,
said vegetation chopping and propulsion units being generally similar in construction so as to similarly effect comminution of vegetation as well as propulsion of the watercraft,
said first vegetation chopping and propulsion unit comprising a first pair of propellers mounted on the watercraft for rotation about a respective one of a first pair of laterally spaced, generally fore-and-aft extending axes,
said second vegetation chopping and propulsion unit comprising a second pair of propellers mounted on the watercraft for rotation about a respective one of a second pair of laterally spaced, generally fore-and-aft extending axes,
said propellers of each of the pairs including a plurality of blades that project radially relative to the respective axis and are pitched in an opposite direction than the blades of the other propeller of the pair, such that the propellers of each of the pairs are rotated in opposite directions to propel the watercraft in a forward or backward direction.

20. An aquatic vegetation shredder, comprising:

a watercraft;

a first vegetation chopping and propulsion unit supported on the watercraft adjacent the stern end; and a second vegetation chopping and propulsion unit supported on the watercraft adjacent the bow end, each of said vegetation chopping and propulsion units being operable to comminute vegetation and propel the watercraft through water, said vegetation chopping and propulsion units being generally similar in construction so as to similarly effect comminution of vegetation as well as propulsion of the watercraft, said first vegetation chopping and propulsion unit comprising a first pair of propellers mounted on the watercraft for rotation about a respective one of a first pair of laterally spaced, generally fore-and-aft extending axes, said second vegetation chopping and propulsion unit comprising a second pair of propellers mounted on the watercraft for rotation about a respective one of a second pair of laterally spaced, generally fore-and-aft extending axes, each of said propellers being adjustably supported on the watercraft so that each of propellers may be vertically shifted relative to the watercraft.

21. An aquatic vegetation shredder as claimed in claim 20, each of said vegetation chopping and propulsion units including a frame rotatably supporting the respective pair of propellers and being swingably mounted on the watercraft to permit simultaneous vertical shifting of the respective pair of propellers relative to the watercraft.

22. An aquatic vegetation shredder, comprising:

a watercraft;

a plurality of stern propellers mounted on the watercraft adjacent the stern end, with each of the stern propellers being rotatable about a respective one of a plurality of laterally spaced, generally fore and aft extending stern axes; and a plurality of bow propellers mounted on the watercraft adjacent the bow end, with each of the bow propellers being rotatable about a respective one of a plurality of laterally spaced, generally fore and aft extending bow axes;

said stern and bow propellers being configured to comminute vegetation and propel the watercraft through water when rotated, each of said propellers being positionable so as to be only partly submerged.

23. An aquatic vegetation shredder as claimed in claim 22, said plurality of stern and bow propellers being simultaneously operable to cooperatively propel the watercraft in one direction.

24. An aquatic vegetation shredder as claimed in claim 23, said one direction being a generally fore and aft direction relative to the bow and stern ends of the watercraft.

25. An aquatic vegetation shredder as claimed in claim 23, said one direction being a substantially circular course wherein the watercraft generally rotates about an upright axis.

26. An aquatic vegetation shredder, comprising:

a watercraft;

a first vegetation chopping and propulsion unit supported on the watercraft adjacent the stern end; and a second vegetation chopping and propulsion unit supported on the watercraft adjacent the bow end, each of said vegetation chopping and propulsion units being operable to comminute vegetation and propel the watercraft through water, said vegetation chopping and propulsion units being generally similar in construction so as to similarly effect comminution of vegetation as well as propulsion of the watercraft, each of said units being positionable so as to be only partly submerged.

27. An aquatic vegetation shredder as claimed in claim 26, said units being simultaneously operable to cooperatively propel the watercraft in one direction.

28. An aquatic vegetation shredder as claimed in claim 27, said one direction being a generally fore and aft direction relative to the bow and stern ends of the watercraft.

29. An aquatic vegetation shredder as claimed in claim 27, said one direction being a substantially circular course wherein the watercraft generally rotates about an upright axis.

* * * * *